Aug. 6, 1929.  J. BARWICKI  1,723,122
SAFETY PARACHUTE
Filed Aug. 22, 1928
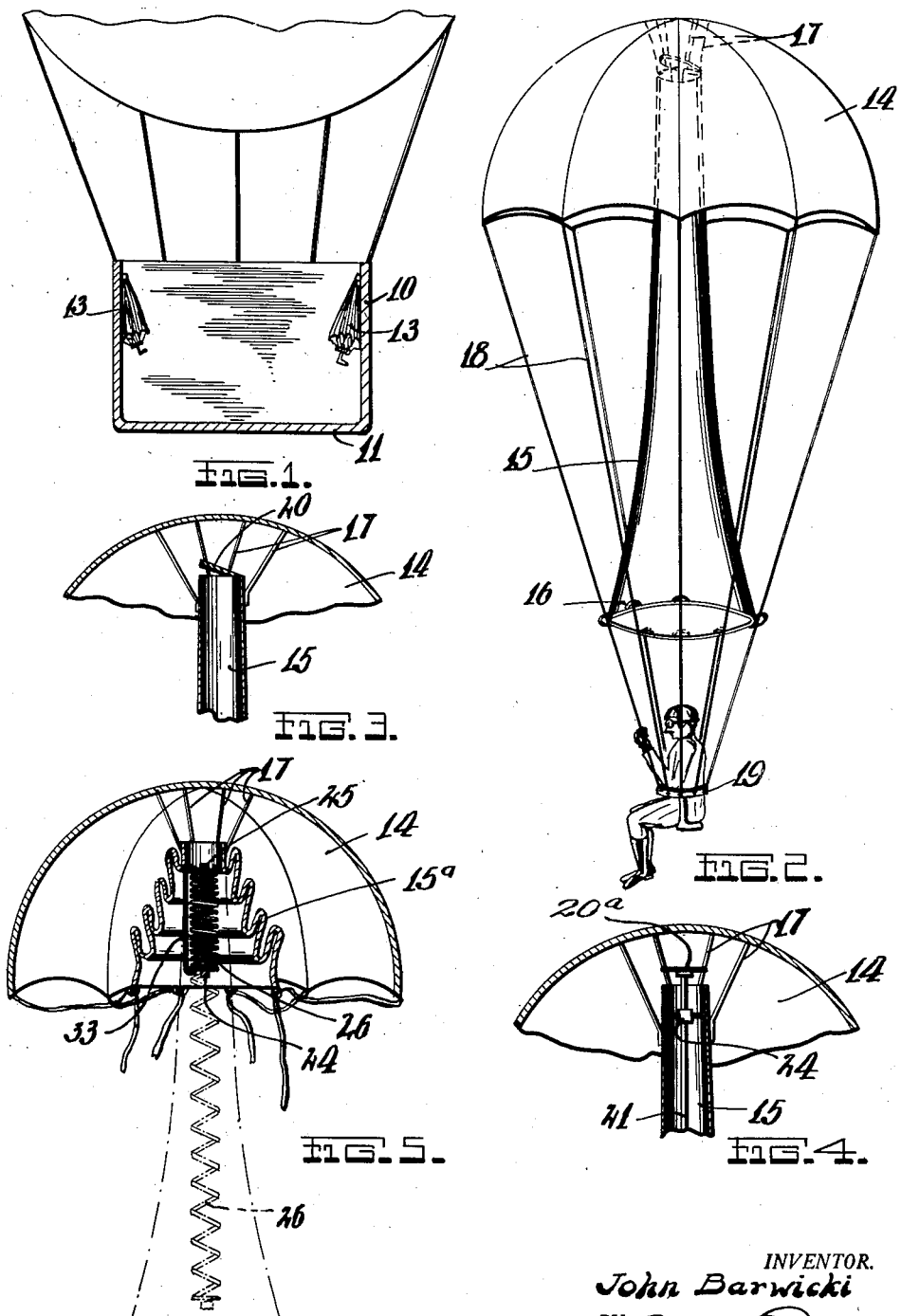
INVENTOR.
John Barwicki
BY
ATTORNEY Patented Aug. 6, 1929.

1,723,122

UNITED STATES PATENT OFFICE.

JOHN BARWICKI, OF NEW YORK, N. Y.

SAFETY PARACHUTE.

Application filed August 22, 1928. Serial No. 301,172.

This invention relates generally to parachutes, and has more particular reference to a novel parachute provided with positive opening means during operation.

The invention has for an object the provision of a device of the class mentioned which is of simple durable construction, desirable and efficient in action, and which can be manufactured and sold at a reasonable cost.

The invention proposes the use of a tube flared at its lower end and attached at its upper end within a parachute and arranged for directing air into the parachute for opening it during descent. A seat or a belt for attachment on a person is supported from the parachute by cords, and the said flared tube extends to within a short distance above the said seat or belt. In operation of the parachute, the inrush of air thru the flared tube is depended upon opening the parachute.

For further comprehension of the invention, and of the object and advantages thereof, reference will be had to the following description and accompanying drawings, and to the appended claims in which the various novel features of the invention are more particularly set forth.

In the accompanying drawing, forming a material part of this disclosure:—

Fig. 1 is a transverse vertical sectional view of a dirigible with parachutes therein, constructed according to this invention.

Fig. 2 is a perspective view of one of the parachutes during descent.

Fig. 3 is a fragmentary vertical sectional view of the top portion of the parachute.

Fig. 4 is a similar view of a modified form of the device, and,

Fig. 5 is a central vertical sectional view of a parachute constructed according to a modified form of the invention.

The reference numeral 10 indicates generally the basket of a flying machine of any design or construction. Parachutes 13 are attached on the walls of the basket. Persons with the basket may have the parachutes applied, and for using the parachutes it is necessary only to disconnect them from the wall, and then jump from the basket.

The parachute 13 comprises a foldable parachute sail 14 and a tube 15 flared at its bottom end as at 16, and extending considerably below the bottom edge of the parachute sail, and at its top end extending into the sail in proximity of the center thereof and thus attached by braces 17. Cords 18 are attached at one of the ends on the lower edge of the sail 14 and have a seat 19 attached on the other ends for supporting a person. The end of the tube within the sail has a one way flap valve 20 arranged for allowing air to pass from within the tube into the sail for opening it.

In operation of the device, the sail 14 must necessarily open during descent since air passing thru the tube 15 inflates it partially, and then air can pass in from the outside for completely opening it. This organization insures the opening of the device, and the safe landing of the passenger.

In Fig. 4 a modified form of the device has been illustrated in which the inner end of the tube 15 is provided with a valve $20^a$ manually operable by the passenger in the parachute by reason of a rod 21 attached on the valve, slidably mounted within a standard 22 fixed within the tube, and extending thru the flared end of the tube to within reach of the passenger. During the initial portion of descent the rod 21 may be moved for opening the valve 20, or if preferred the rod 21 may be moved for holding the valve closed for a short period of time and then moved to an open position, for causing the parachute sail to open.

In Fig. 5 a modified form of the device has been illustrated in which the tube $15^a$ may be forced into collapsed condition and held by a hook 33 pivotally mounted on the top portion of the tube and engageable on a cross bar 24 attached on the lowermost portion. A second cross bar 25 is attached on the top portion and an expansion spring 26 acts between the cross bars for normally moving the tube into expanded condition.

During storing of the device the hook 33 is engaged for holding the tube $15^a$ collapsed. Before using the parachute for descending the hook is disengaged for allowing the spring 26 to expand the tube $15^a$ and assure opening of the parachute.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A safety parachute, comprising a tube capable of being forced into a collapsed condition, and attached at its top end within a parachute sail, a hook pivotally mounted on the top portion of the tube, and engageable with a cross bar attached on the lower portion of the tube when the tube is in a collapsed condition for holding same in the said condition, a second bar attached on the top portion of the tube, and an expansion spring acting between the said bars for normally moving the tube into expanded condition.

2. A safety parachute, comprising a tube capable of being forced into a collapsed condition, and attached at its top end within a parachute sail, a hook pivotally mounted on the top portion of the tube, and engageable with a cross bar attached on the lower portion of the tube when the tube is in a collapsed condition for holding same in the said condition, a second bar attached on the top portion of the tube, and means acting between the said bars for normally moving the tube into expanded condition.

In testimony whereof I have affixed my signature.

JOHN BARWICKI.